April 12, 1955     C. T. GUADAGNA     2,705,983
DISPLACEABLE HALF NUTS FOR QUICK RELEASE CLAMPS
Filed Jan. 24, 1951
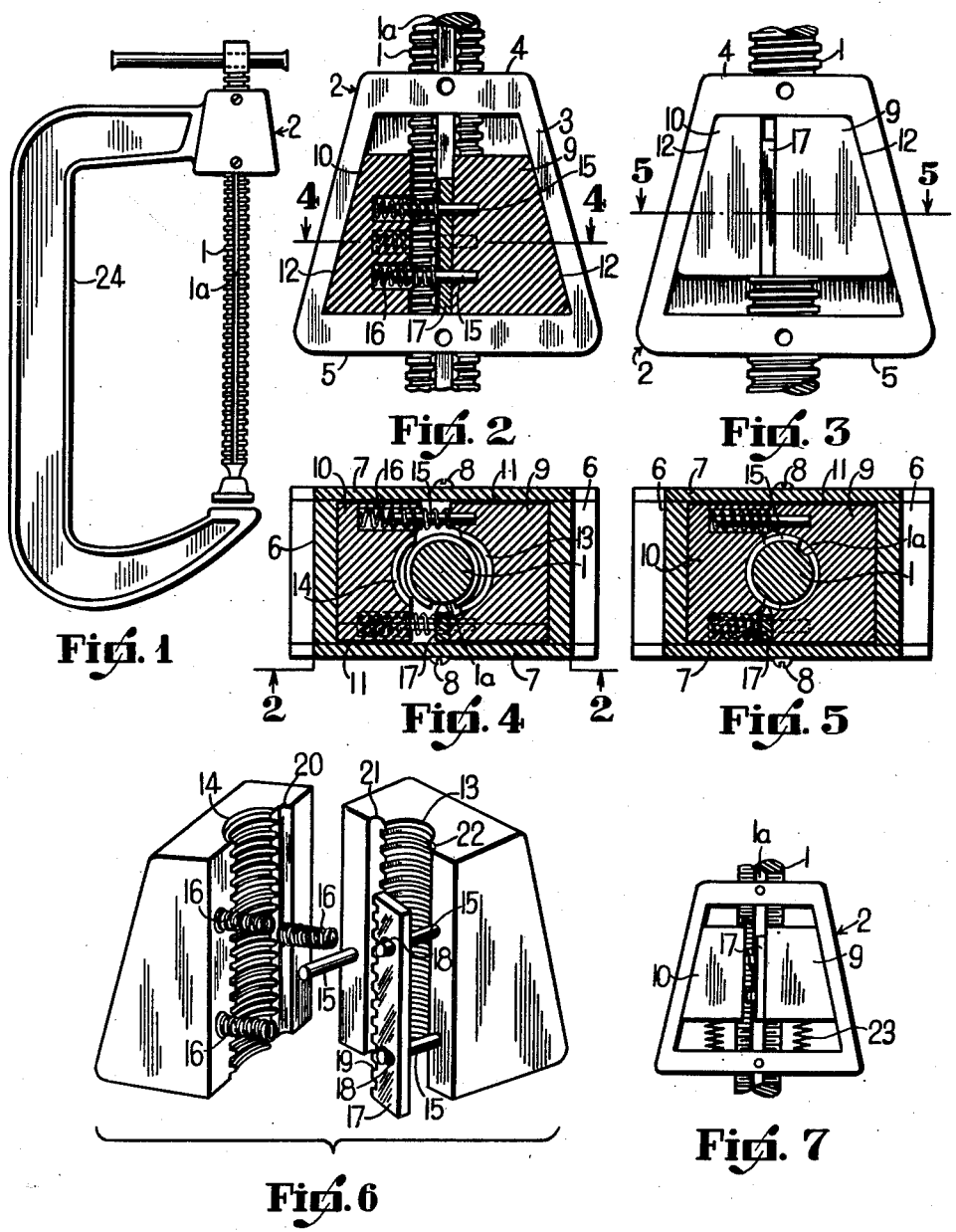
INVENTOR.
Clement T. Guadagna

United States Patent Office 2,705,983
Patented Apr. 12, 1955

2,705,983

DISPLACEABLE HALF NUTS FOR QUICK RELEASE CLAMPS

Clement T. Guadagna, Oakland, Calif.

Application January 24, 1951, Serial No. 207,528

2 Claims. (Cl. 144—305)

My invention relates to a new and useful improvement in a quick release nut.

The object of my invention is to provide a quick release nut which has means to make it act with greater certainty. In general this type of nut is old, but in the present forms the threaded parts after they have been separated for release are hard to bring together again into clamping relation. My improvement overcomes this difficulty.

This and other objects are accomplished by the means shown in the accompanying drawing, fully set forth in the following description, and more particularly pointed out in the claims.

In the drawing:

Fig. 1 is a view showing the application of my nut to a C-clamp.

Fig. 2 is an elevation, partly in section, on line 2—2 of Fig. 4, looking in the direction of the arrows, and the parts being in releasing position.

Fig. 3 is a side elevation of the nut with cover plates removed, and the parts being in clamping position.

Fig. 4 is a transverse section on line 4—4 of Fig. 2, looking in the direction of the arrows.

Fig. 5 is a transverse section on line 5—5 of Fig. 3, looking in the direction of the arrows.

Fig. 6 is an exploded view on a large scale, showing some of the parts in disassembled relation.

Fig. 7 is a side elevation of a modification of my nut, the cover plates being removed.

In the different views like numerals refer to like parts.

The screw to be engaged is indicated by 1, and the nut as a whole by 2. The screw has throughout its length an axially extending groove 1a.

As shown by Figs. 2 to 5, the nut 2 has an inclosing shell 3 in the form longitudinally of an isosceles trapezoid, and transversely of a rectangle having an upper base 4, a lower base 5, and inclined side walls 6. This shell is completed by similar cover plates 7 secured by screws 8 at top and bottom on the longitudinal center line of the frame.

Within the shell are the threaded sections 9 and 10 forming the nut proper. These are shown best by Figs. 4 to 6 as having parallel front and back walls 11 and inclined end walls 12 which are complementary to the side walls 6 of the shell 3. As best seen in Fig. 6, section 9 is of slightly greater transverse width than section 10, and has a threaded segment 13, while the section 10 has a threaded segment 14. To the section 9 are attached three similar dowel pins 15, which when the parts are assembled can enter corresponding holes in the section 10. Surrounding each of these pins is a compression coil spring 16, these springs tending to separate the sections 9 and 10 as best shown by Figs. 4 and 5. A feeler plate 17 is shown by Fig. 6 as having holes 18 to loosely receive two of the dowel pins and slide upon them. It will be seen from cross-sections 4 and 5 and from Fig. 6 that the front wall 11 of the section 10 is not as wide as its rear wall. This affords a recess in front to receive the feeler plate 17 when the parts are brought together as shown in Fig. 5. It will be seen from Fig. 6 that the feeler plate 17 has an inner toothed edge 19, these teeth corresponding in pitch and approximately in form to the threads of the sections 9 and 10 to which it is connected by the dowel pins. Therefore, if the feeler plate 17 is made to engage the threads of the screw member 1, the nut sections will also engage it when brought together. It will be seen from Fig. 4 that the feeler plate 17 can enter the groove 1a in the threaded member and slide along it like a spline, also carrying the sections 9 and 10 along with it. This figure also shows that making the section 9 radially larger than section 10 puts the feeler plate 17 in a position to engage both the groove 1a and threads of the screw member 1 even when the sections 9 and 10 are separated. This is true because the feeler plate is of the same width as the wall on the half nut 9 that it engages and the teeth of the feeler plate do not protrude past the thread on the half nut 9 whereby the feeler plate can enter the groove 1a. Because the nut section 9 engages somewhat more than half the circumference of the screw spindle for locating the feeler plate somewhat beyond alignment with the diametric line of the screw spindle when the screw is finally engaged by the nut sections. Then when they come together the feeler plate is able to ride over the member 1 into the recess provided for it in the nut member 10.

It will be seen from Figs. 4 and 5 and 6 that I have chamfered for about a sixteenth of an inch the edges of the threaded bore of the sections 9 and 10 at 20 and 21 and 22 to facilitate their engagement with the screw member.

The operation of my device is obvious. Having the screw member 1 engaging the nut member 2 with the threaded nut sections 9 and 10 separated as shown by Figs. 2 and 4, the screw member is advanced through the nut member having its groove 1a engaged by the feeler 17. When the screw has reached the object to be clamped, a rotative force is applied to the screw until the toothed edge 19 of the feeler finally engages the screw thread.

It will be understood that when the threads of the split nut and the screw spindle are misaligned, upon turning of the screw spindle the crests of its thread will engage the crests of the teeth on the feeler plate and tilt said feeler plate upon the pins 15 as a pivot until the crests of the teeth of the plate snap into the troughs of the thread on the screw spindle, thus aligning the threads of the split nut and the screw spindle.

Fig. 7 shows a modification of my device for use with threaded members having fine threads. To accomplish this any number (two being usually sufficient) of compression springs 23 are arranged between the bottom surfaces of the sections 9 and 10 and the bottom 5 of the frame 3. The threaded sections are thus constantly urged into contact with each other and the screw member 1. This modification is otherwise as in the first form, and the operation is similar.

My device can be used as a quick release nut for screws generally, though especially adapted to be part of the C-clamp shown; in this case the nut carrier 3 is made integral with the clamp body.

Having thus described my invention, I claim:

1. In combination, a thrust screw provided with a uniform longitudinal side groove extending through its thread portion, a longitudinally split nut having transversely separable sections normally separated for freely receiving the screw between them and having their mutually opposite outer side faces rearwardly tapered toward the screw and having the unthreaded parts of their inner side faces flat and parallel to the axis of their thread portions with one of said sections arranged to encompass more than half of the circumference of the screw when engaged therewith, a relatively fixed carrier cage member receiving the screw and nut longitudinally thereof and providing a space longer than the nut and having sides complementary tapered with respect to the opposed tapered sides of the enclosed nut sections for effecting a relative transverse movement of the nut sections to respectively engage or disengage the thread of the screw by reason of their longitudinal adjustment in the tapered cage toward or from the rear end of the space, mutually parallel guide pins constantly cooperative with and between the nut sections for restraining them against a relative longitudinal movement and defining a plane perpendicular to the flat inner face of the said one nut section and parallel to the axis of the thread of the section, a feeler plate member disposed between the inner faces of the nut sections and having a toothed edge freely extendable into the longitudinal screw groove and complementarily engageable with the screw thread and mounted on said guide pins adjacent said one nut section for rocking about an axis in said plane of the pins and parallel to said inner section face, and helical compression springs mounted on the pins between the feeler plate and the opposed inner face of the other nut section to yieldingly urge a flat disposal of the feeler plate against the opposed inner face of the said one nut section while urging a mutual separation of the nut sections, said feeler plate being freely engageable in said groove in radial relation to the screw to provide for a free longitudinal movement of the screw with respect to the cage or rockable laterally from the groove for the riding of the crests of its teeth upon the crest portions of the screw thread upon an advancing turning of the screw until its teeth are caused to fully register with the trough of the screw thread to then positively engage the nut threads with the screw thread for a working turning of the screw therein.

2. In combination, a thrust screw provided with a uniform longitudinal side groove extending through its thread portion, a longitudinally split nut having transversely separable sections normally separated for freely receiving the screw between them and having their mutually opposite outer side faces rearwardly tapered toward the screw and having the unthreaded parts of their opposed inner side faces flat and parallel to the axis of their thread portions with one of said sections arranged to encompass more than half of the circumference of the screw when engaged therewith, a relatively fixed carrier cage member receiving the screw and nut longitudinally thereof and providing a space longer than the nut and having sides complementarily tapered with respect to the opposed tapered sides of the enclosed nut sections for effecting a relative transverse movement of the nut sections to respectively engage or disengage the thread of the screw by reason of longitudinal adjustments of the nut sections in the tapered cage space toward or from the rear end of the space, a guide means constantly cooperative between the nut sections for restraining them against a relative longitudinal movement thereof while permitting their relative transverse movement, a spring means constantly urging a mutual transverse separation of the nut sections imposed by the enclosing cage member, a feeler plate member disposed between the inner faces of the nut sections and having a toothed edge freely extendable into the longitudinal screw groove and complementarily engageable with the trough of the screw thread and hingedly related to said one nut section for rocking about an axis which is in spaced parallel relation to the axis of the section thread portion, and a spring means constantly operative to yieldingly urge a movement of the feeler plate toward the opposed inner face of the said one nut section, said feeler plate being freely engageable in said groove in radial relation to the screw to provide for a free longitudinal movement of the screw with respect to the cage or a rocking displacement of the feeler plate from the groove for the riding of the crests of its teeth upon the crest portions of the screw thread upon an advancing turning of the screw until its teeth register with the trough of the screw thread to then positively align the nut threads with the screw thread so that a continued advancing rotation of the screw is thereafter operative to operatively propel the screw from the nut sections.

References Cited in the file of this patent
UNITED STATES PATENTS

| | | |
|---|---|---|
| 294,781 | Hilts | Mar. 11, 1884 |
| 854,512 | Mapes | May 21, 1907 |
| 1,340,477 | Dallard | May 18, 1920 |
| 1,475,907 | Volman | Nov. 27, 1923 |
| 1,846,422 | Hands | Feb. 23, 1932 |
| 2,156,195 | Robillard | Apr. 25, 1939 |